United States Patent Office
3,362,914
Patented Jan. 9, 1968

3,362,914
URANIUM CARBIDE-PLUTONIUM PHOSPHIDE AS A REACTOR FUEL
Owen L. Kruger, Westmont, John B. Moser, Evanston, James W. Thompson, Hinsdale, and Robert E. Mailhiot, Palos Hills, Ill., assignors to the United States of America as represented by the United States Atomic Energy Commission
No Drawing. Filed June 13, 1967, Ser. No. 646,158
3 Claims. (Cl. 252—301.1)

ABSTRACT OF THE DISCLOSURE

A nuclear reactor fuel containing a mixture of uranium carbide and plutonium phosphide, which can be made into a fuel element by compacting relatively coarse uranium carbide particles into a fuel element tube and filling the interstices between the uranium carbide particles with relatively fine plutonium phosphide by vibratory compaction to form a dispersion of uranium carbide in plutonium phosphide.

*Contractual origin of the invention*

The invention described herein was made in the course of, or under, a contract with the United States Atomic Energy Commission.

*Background of the invention*

This invention relates to a nuclear reactor fuel. More specifically, this invention relates to a fuel for a fast breeder reactor comprising a mixture of uranium carbide and plutonium phosphide.

Present emphasis in the design and construction of nuclear reactors is on breeder reactors. Breeder reactors are able to produce more fissionable material than is required for the operation of the reactor. Because of the operating characteristics necessary to produce breeding, new reactor fuels must be developed which have the necessary physical characteristics for functioning in a breeder-reactor environment. This includes the ability to withstand high temperatures without a change in composition which would result in changing physical characteristics. The fuel selected should also have good thermal conductivity for greater efficiency and to prevent melting of the fuel within the reactor.

A reactor fuel should be easy to handle and fabricate into fuel elements so that the costs may be kept as low as possible.

Some breeder reactor cores consist of separate zones, a central zone containing fissionable material, where most of the nuclear fissions occur, and surrounding this, a blanket zone which includes fertile material to capture the stray neutrons from the fuel section and which, upon undergoing decay, becomes fissionable. Present designs call for blanket or fertile material mixed with fissionable material in the central zone of the core in addition to the surrounding blanket section.

One such mixture which may be used in the central zone is a mixture of uranium carbide and plutonium carbide in which the uranium is the fertile material which becomes fissionable upon absorption of neutrons and decays to plutonium. The plutonium carbide is the fissionable material which is necessary to initiate and sustain the reaction.

Although the uranium carbide has excellent physical properties, that is, a high melting point and good thermal conductivity, plutonium carbide melts at 1660° C. and has relatively poor thermal conductivity. Production of fuel elements of this mixture would also be complex and expensive, because plutonium carbide is extremely reactive chemically in a normal nitrogen glove-box atmosphere, necessitating extra special handling. Plutonium carbide is difficult to produce in the desired stoichiometric composition in large quantities due to loss of plutonium. Because of these considerations, preparation of mixtures of uranium carbide and plutonium carbide cannot be separated into two production processes, one for the plutonium carbide subject to all the necessary requirements for handling the highly toxic plutonium, that is, an alpha-active glove box, and another process for the uranium carbide component which can utilize existing equipment and technology. Instead, the uranium carbide-plutonium carbide solid solution must be made by reacting uranium and plutonium with carbon in the special glove box under an inert atmosphere, an expensive and difficult operation.

Uranium-plutonium oxides are also under consideration as a breeder reactor fuel. They both have relatively low degrees of thermal conductivity. In addition, at the temperatures envisioned for breeder reactor operation, decomposition will occur, resulting in changes in stoichiometry, resulting in varying physical properties. Thus neither uranium carbide-plutonium carbide nor uranium dioxide-plutonium dioxide mixtures are thoroughly satisfactory as reactor fuels.

*Summary of the invention*

We have invented a breeder reactor fuel which overcomes the objections to the carbide and oxide fuel mixtures without losing any of the advantages of these fuels. The fuel of this invention comprises a mixture of uranium carbide as the fertile material and plutonium phosphide as the fissionable material. This fuel can be fabricated into fuel elements by conventional methods or by vibratory compaction. When using vibratory compaction, the fuel rod is filled with uranium carbide in a relatively coarse physical state. The plutonium phosphide is then added to the fuel rod as a relatively fine powder and compacted into place by vibration to produce a mixture of uranium carbide in plutonium phosphide. By careful control, the fuel element could then be inserted into a reactor and sintered in place, thereby eliminating the additional sintering step. An advantage in using the vibratory compaction method is that only the final step of adding the plutonium phosphide to the uranium-carbide-filled fuel rod need be carried out under conditions necessary for handling alpha-active material.

It is therefore an object of this invention to provide a nuclear reactor fuel mixture which is stable at high temperature.

It is another object of this invention to provide a nuclear reactor fuel mixture which has a high thermal conductivity.

Finally it is an object of this invention to provide a nuclear reactor fuel mixture which is relatively simple and inexpensive to fabricate into fuel elements.

*Description of the preferred embodiment*

These and other objects of the invention can be attained by using a mixture of uranium carbide and plutonium phosphide as a nuclear reactor fuel. In this mixture uranium carbide is the fertile material and plutonium phosphide is the fissionable material.

This fuel can be prepared by mixing powdered uranium carbide and powdered plutonium phosphide to form a mixture. The mixed powders can then be pressed into compacts of the desired size and shape, followed by sintering in an inert atmosphere at a temperature above about 1300° C. This then forms a compact which is a solid solution of uranium carbide-plutonium phosphide.

An alternative method of making fuel elements of uranium carbide and plutonium phosphide is to fill a fuel element tube with the desired quantity of uranium carbide in a relatively coarse physical form. This is done under an inert atmosphere but not necessarily in a glove box. Plutonium phosphide which is less dense than the uranium carbide is then added to the fuel element rod as a relatively fine powder in a glove box. Vibratory compaction of the fuel rod causes the plutonium phosphide to sift down the rod, filling the interstices between the uranium carbide particles to form a dispersion of relatively large uranium carbide particles in a matrix of plutonium phosphide. The fuel rod is then sintered in an oven or in an operating reactor in which the temperature and other operating conditions are carefully controlled.

The composition of the fuel is not specific but can vary according to the design of the particular reactor in which it is to be used. The fuel may consist of 50% or less plutonium phosphide, the balance being uranium carbide. Generally, a breeder reactor fuel will contain from 10 to 30% plutonium phosphide.

*Example I*

A blend of powders was obtained by mixing powdered uranium carbide with 20% powdered plutonium phosphide in a glove box under an inert atmosphere. The resulting mixture was pressed into compacts at a pressure of 20,000 p.s.i. The resulting compact was sintered at 1800° C. in high-purity flowing argon at 1 atmosphere of pressure. A solid solution was obtained which showed no discernible signs of separation. The resulting solution had a melting point of 2350° C.

*Example II*

A fuel element is made by taking a fuel tube 23.06 inches long having an internal diameter of 0.276 inch and mounting it on a vibrator. With the vibrator operating, 166.49 grams of uranium carbide in the form of small shot about 0.086 inch in diameter is added to the tube under an inert atmosphere and vibration continued. Once the uranium carbide is compacted, the tube and vibrator are placed in a glove box equipped for high alpha-radiation activity and, while vibrating, 54.30 grams of plutonium phosphide in the form of small particles about 0.009 inch in diameter are slowly added to the uranium-carbide-filled tube. Vibration of the tube is continued until the plutonium phosphide is uniformly dispersed in the interstitial spaces between the uranium carbide particles throughout the tube, forming a uniform dispersion of uranium carbide in plutonium phosphide. The tube is then sealed and is ready for sintering or for insertion into a reactor.

It is understood that the invention is not to be limited to the details given herein, but that it may be modified within the scope of the appended claims.

The embodiments of the invention in which an exclusive property or privilege is claimed are defined as follows:

1. A nuclear reactor fuel comprising a mixture of plutonium phosphide and uranium carbide.

2. The reactor fuel of claim 1 comprising 10–50% plutonium phosphide.

3. The reactor fuel of claim 2 comprising 20% plutonium phosphide.

References Cited

UNITED STATES PATENTS

| | | | |
|---|---|---|---|
| 3,236,922 | 2/1966 | Isaacs et al. | 176—89 X |
| 3,264,223 | 8/1966 | Baskin et al. | 176—89 X |
| 3,309,322 | 3/1967 | Anselin et al. | 176—89 X |

L. DEWAYNE RUTLEDGE, *Primary Examiner.*

M. J. SCOLNICK, *Assistant Examiner.*